United States Patent [19]

Stuck

[11] Patent Number: 5,673,610
[45] Date of Patent: Oct. 7, 1997

[54] APPARATUS FOR CONVEYORIZED TOASTING OF BREADS AND LIKE FOOD ITEMS

[76] Inventor: Robert M. Stuck, 17 Old Stage Trail, Lake Wylie, S.C. 29710

[21] Appl. No.: 702,066

[22] Filed: Aug. 23, 1996

[51] Int. Cl.[6] .................... A47J 37/00; A47J 37/08
[52] U.S. Cl. .................... 99/386; 99/349; 99/390; 99/393; 99/423; 99/443 C
[58] Field of Search .................... 99/331–334, 386, 99/385, 389–393, 399, 443 C, 361, 443 R, 369, 374, 377–379, 397, 402, 388, 349, 351, 427, 423; 219/492, 497, 521, 386, 400

[56] References Cited

U.S. PATENT DOCUMENTS

| | | | |
|---|---|---|---|
| 3,646,879 | 3/1972 | Palmason et al. | 99/339 |
| 3,693,452 | 9/1972 | McGinley et al. | 99/386 |
| 3,835,760 | 9/1974 | Rekesius | 99/331 |
| 4,176,589 | 12/1979 | Stuck | 99/443 C |
| 4,261,257 | 4/1981 | Henderson et al. | 99/386 |
| 4,488,480 | 12/1984 | Miller et al. | 99/349 X |
| 4,530,276 | 7/1985 | Miller | 99/386 |

Primary Examiner—Timothy F. Simone
Attorney, Agent, or Firm—Shefte, Pinckney & Sawyer

[57] ABSTRACT

An apparatus for conveyorized toasting of sandwich buns and like bread and food items simultaneously on opposite sides comprises a central heated platen with two bun transport conveyors traveling in spaced relation along opposite sides of the platen and with a pair of auxiliary heating elements disposed outwardly of the respective food transport runs of the conveyors in facing relation to the opposite sides of the platen. Each conveyor is biased toward the platen by a pair of parallel pivot arms urged by springs into pivoted engagement against the transport run of the respective conveyor to define a predetermined desirable spacing to the facing side of the platen.

13 Claims, 5 Drawing Sheets

APPARATUS FOR CONVEYORIZED TOASTING OF BREADS AND LIKE FOOD ITEMS

BACKGROUND OF THE INVENTION

The present invention relates generally to conveyorized food cooking apparatus and, more particularly, to an apparatus for conveyorized toasting of breads and like food items, particularly sliced bread items such as sandwich buns.

The toasting of sliced breads and sandwich buns in the making of hamburgers and other sandwiches is a common practice not only to suit individual tastes and preferences but also to effectively carmelize and seal the faces of the bread to resist absorption of juices and condiments used in the sandwich. Many commercial establishments use bread toasters of the same basic type in widespread home use, comprising a housing with one or more upwardly facing slots for placing multiple slices of bread into a spring-loaded cage by which the bread slices may be lowered into a disposition within the housing between opposed facing heater elements for a predetermined period of time. While such toasters have proven reasonably effective to achieve the intended surface toasting of bread slices, such toasters suffer the significant disadvantages of being relatively slow, often taking in excess of one to one and one-half minutes to achieve the desired surface carmelization of the bread, and are also quite limited in capacity, which makes such equipment relatively undesirable for commercial use in high capacity food preparation establishments such as fast food restaurants. Also, such equipment typically cannot accommodate a variety of differing types and sizes of sliced breads and, in particular, often cannot accommodate hamburger and like sandwich buns or bagels.

Other commercial restaurants utilize a conventional commercial griddle of the type having a stationary base with a flat upwardly facing heated platen and a pivoted cover also comprising a heated platen. While the contact pressure exerted by the pivoted lid on bread slices may enable such griddles to achieve a toasting effect in a somewhat shorter period of time than the conventional toasters of the type described above, the contact pressure may negatively affect the appearance of a toasted bread slice or bun and, further, the capacity of such griddles is still limited by the surface area of the platens.

A conveyorized bread toasting apparatus is described in Miller U.S. Pat. No. 4,530,276, granted Jul. 23, 1985, entitled CONTACT TOASTER and a commercial version of such conveyorized toaster is believed to have achieved a reasonable degree of acceptance within the fast food industry. The conveyorized toaster of the Miller patent is designed particularly for toasting the two halves of hamburger and like sandwich buns and basically utilizes a heated platen centrally disposed within a housing between a pair of oppositely traveling conveyors by which the crown and heel portions of a sandwich bun may be conveyed along the opposite sides of the platen to achieve toasting. While such apparatus addresses the disadvantage of low capacity suffered by the more traditional toasters and griddles described above, the effective increase in capacity has proved to be less than optimal in actual practice because the apparatus still requires one to one and one-half minutes to achieve effective toasting. The Miller patent further teaches only the toasting of the open faces of a sandwich bun, i.e., the sliced surfaces, and thus utilizes the central platen as the sole means of toasting the two bun halves, without any toasting of the outward crown and heel sides thereof, which is believed to be considered by many persons within the restaurant industry and among the general public as an additional disadvantage.

SUMMARY OF THE INVENTION

It is accordingly an object of the present invention to provide an improved apparatus for conveyorized toasting of breads and like food items, especially hamburger and sandwich buns, so as to be suitable for high capacity use in fast food restaurants and other similar commercial food preparation operations. A more specific object of the present invention is to provide a conveyorized toasting apparatus by which breads may be simultaneously toasted on opposite sides thereof. A further object is to provide a conveyorized toasting apparatus by which bun halves and other similar bread items may be effectively toasted in less than half the time typically required by the known conveyorized toaster of the above-identified Miller patent.

Most fundamentally, the conveyorized bread toasting apparatus of the present invention utilizes a pair of heated toasting elements arranged in opposed spaced facing relation to one another for simultaneously toasting opposite sides of a food item, a conveyor arrangement for transporting food items between the toasting elements, and a means for biasing the conveyor to maintain contact with the food items during transport thereof.

Preferably, one toasting element is a heated platen or other equivalent form of toasting element presenting a generally planar food-contact surface along which one side of a sandwich bun half, another bread slice, or a like food item may be transported in direct sliding contact by a food transport run of the conveyor, with the other toasting element being disposed at the opposite side of the food transport run of the conveyor to provide auxiliary toasting of the side of the bun half, bread slice, or other food item opposite the platen.

In a preferred embodiment, the platen has two food contact surfaces at its opposite sides and the apparatus includes two conveyors with respective food transport runs extending in spaced relation along the opposite sides of the platen with auxiliary toasting elements facing the opposite sides of the platen outwardly of the food transport run of each conveyor. The food transport run of each conveyor is biased toward the platen, preferably by a pair of arms extending in spaced parallel relation to one another in the food transport direction and supported for independent pivoting movement toward and away from contact with the food transport run opposite the platen and a spring arrangement for urging the arms pivotably into contact with the food transport run. A stop element or device may be provided to limit the amount of movement of the biasing arms away from the food transport run of the respective conveyor to ensure optimal contact with food items being transported through the toasting apparatus. Each conveyor is preferably driven by a variable speed drive motor and a thermostatic control may be provided for the heating elements, so as to enable the degree of toasting and the time required for toasting to be selectively modulated.

Such embodiment may be optimally utilized for toasting sandwich buns of the type having a crown portion and a heel portion, wherein the crown portion typically is of a greater thickness than the heel portion. Hence, in this embodiment, the two conveyors may be arranged at different spacings from the opposite sides of the platen to enable one conveyor to optimally transport the crown portion of buns along one side of the platen while the other conveyor is optimally adapted to transport the heel portion of buns along the other side of the platen.

DETAILED DESCRIPTION OF THE PREFERRED EMBODIMENT

Figure 1:
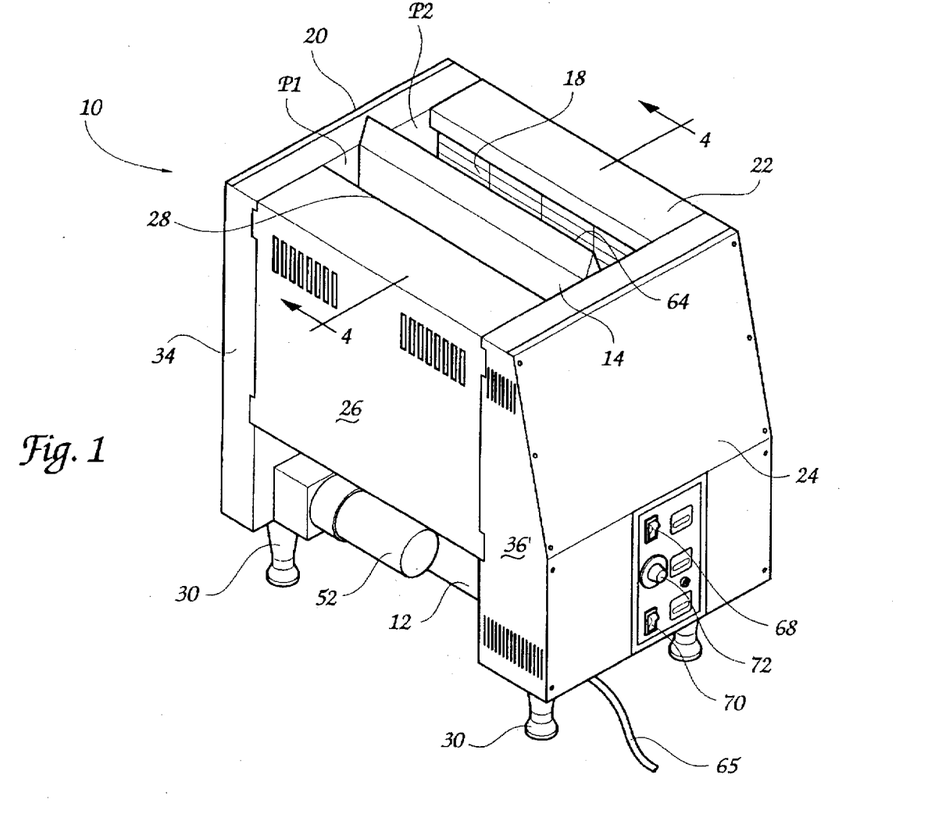
FIG. 1 is a perspective view of a conveyorized toasting apparatus in accordance with one preferred embodiment of the present invention.
Figure 2:
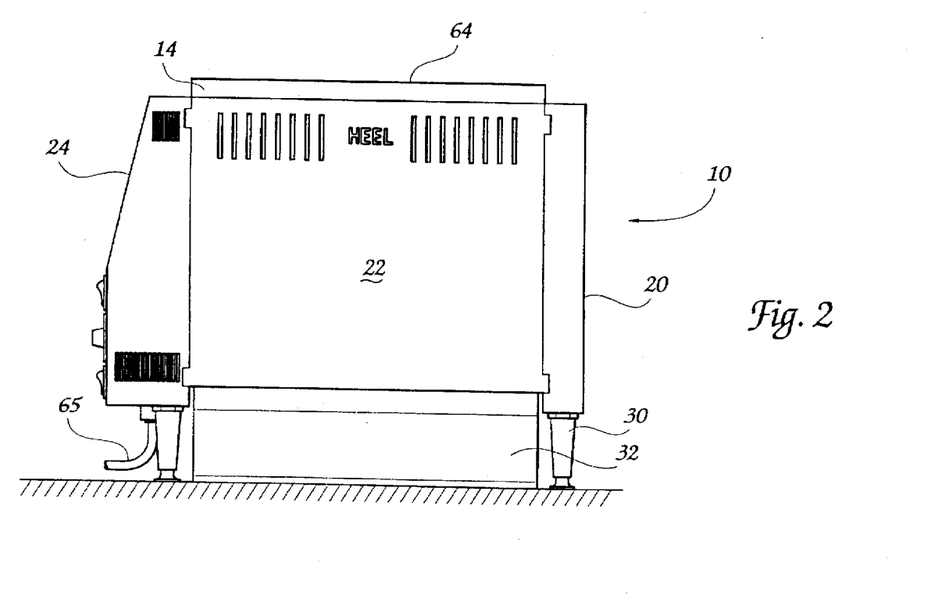
FIG. 2 is a side elevational view of the toasting apparatus of FIG. 1.
Figure 3:
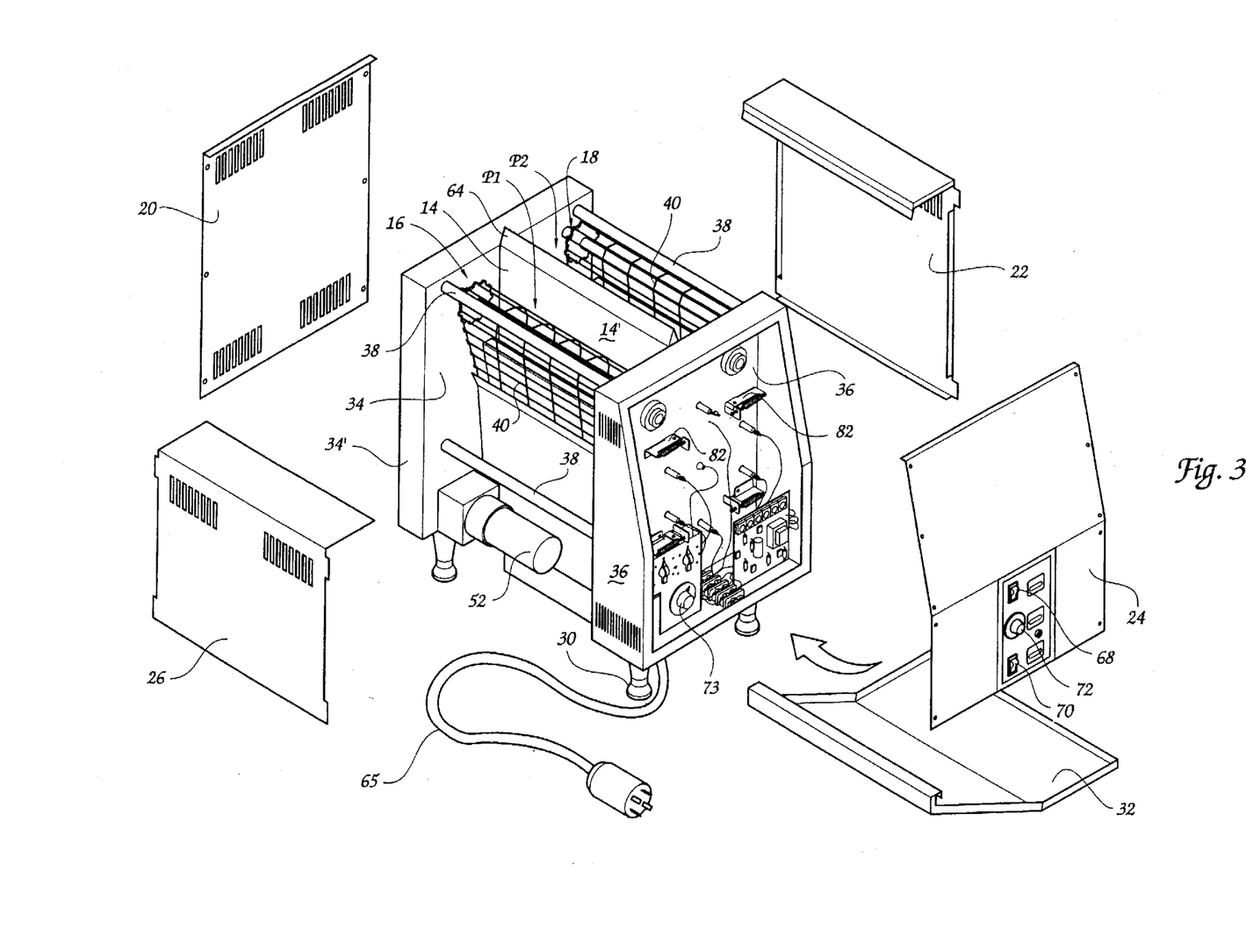
FIG. 3 is a partially exploded perspective view of the toasting apparatus of FIG. 1.

Referring now to the accompanying drawings and initially to FIGS. 1–3, a conveyorized toasting apparatus according to the present invention is indicated generally at 10 in an embodiment thereof preferred and intended for the automated toasting of hamburger-style sandwich buns on a continuous basis in a commercial restaurant setting. However, those persons skilled in the relevant art will readily recognize and understand that the present toasting apparatus is susceptible of various other specific embodiments, e.g., for toasting other types of breads and even other types of foods. Hence, all such variations on the present invention are intended to be within the scope and substance of the present invention.

As shown in FIGS. 1–3, the toasting apparatus 10 basically includes an upstanding frame 12 supporting a vertically oriented central platen 14 and a pair of driven food transport conveyor assemblies 16,18 vertically oriented at opposite sides of the platen 14 in spaced relation thereto to define separate bun transport paths P1,P2 vertically along opposite sides of the platen 14. The outward sides and ends of the frame 12 are enclosed by housing panels 20,22,24,26 which collectively serve to define a bun loading opening 28 at the upwardly facing side of the frame 12 into the two bun transport paths P1,P2 and similarly define a bun discharge opening 29 (FIG. 4) at the downwardly facing side of the frame 12 directly beneath the bun transport paths P1,P2. The frame 12 is supported in an elevated position by feet 30 at the opposite frame corners and an angular panel 32 is mounted to the frame to extend laterally beneath the bun discharge opening 29 to deflect toasted buns exiting the transport paths P1,P2 to the forward side of the apparatus 10 shown in FIGS. 2 and 3.

More specifically, as best shown in FIG. 3, the frame 12 comprises a pair of end frame plates 34,36 vertically disposed in spaced parallel facing relation by a plurality of frame rods 38 extending horizontally therebetween. In addition to providing structural rigidity to the frame, the frame rods 38 serve as mounts for the housing panels 22,26. Flanges 34', 36' extend from the side edges of each of the end frame plates 34,36, respectively, to cooperate with the respective panels 20,24 to define housing enclosures for electronic and drive components of the apparatus 10, as more fully explained below.

Figure 4:
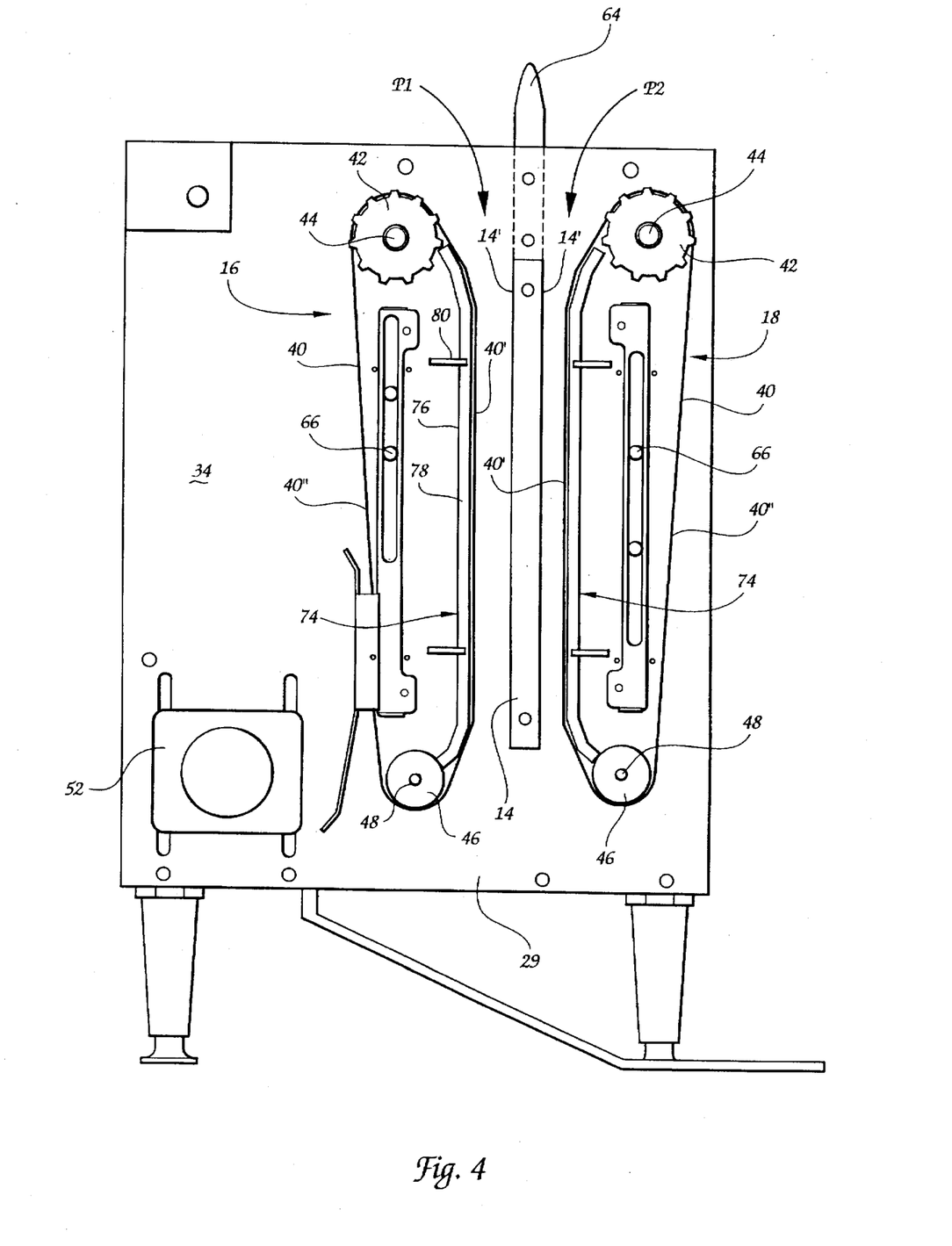
FIG. 4 is a vertical cross-sectional view of the toasting apparatus of FIG. 1, taken along line 4—4 thereof.

As best seen in FIGS. 3 and 4, each conveyor assembly 16,18 comprises an endless wire link conveyor 40 trained about a pair of upper sprockets 42 mounted at spacings along the length of a shaft 44 supported rotatably by the end frame plates 34,36 to rotate about a horizontal axis and, similarly, about a pair of lower sprockets 46 mounted at a corresponding spacing along the length of another shaft 48 rotatably supported by the end frame plates 34,36 about a parallel horizontal axis directly below the upper shaft 44. In this manner, each wire link conveyor 40 is arranged to travel vertically along a food transporting run 40' at a spacing immediately adjacent to one facing surface of the platen 14 and a return run 40" extending vertically at a more outward spacing from the platen 14.

Figure 5:
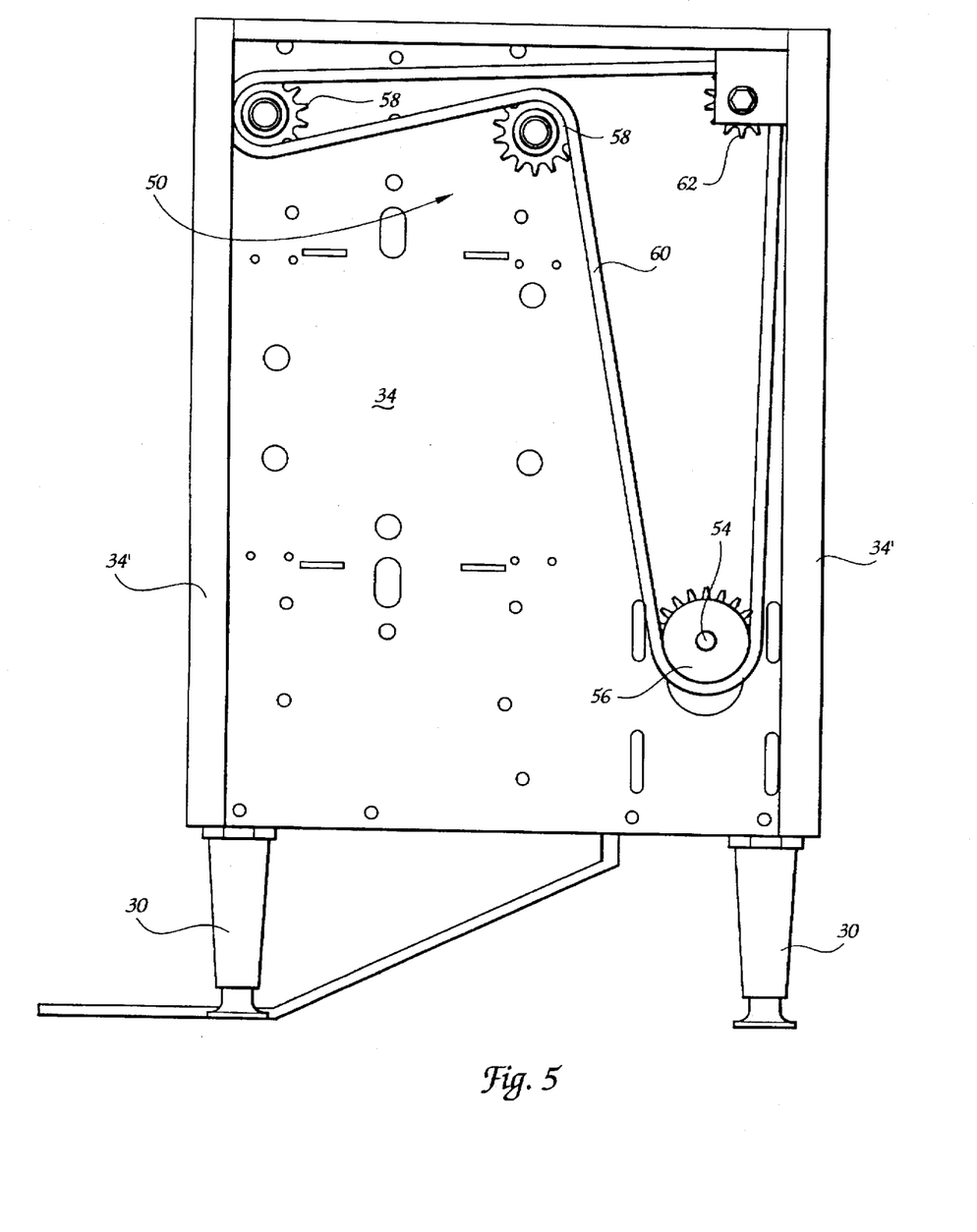
FIG. 5 is an end elevational view of the toasting apparatus of FIG. 1, with the housing panel removed to reveal the conveyor drive arrangement of the apparatus.

The two link conveyors 40 of the conveyor assembly 16,18 are driven synchronously with one another by a common drive arrangement, indicated generally at 50 in FIG. 5. The drive arrangement 50 includes an electric drive motor 52 mounted to the inward side of the end frame plate 34 (see FIGS. 1 and 3), with the drive shaft 54 of the motor 52 extending through the plate 34 into the housing enclosure at the opposite outward side of the frame plate 34 at which the drive shaft 54 has a drive sprocket 56 rigidly fixed thereto. Similarly, the ends of the upper conveyor shafts 44 of the two conveyor arrangements 16,18 extend through the end frame plate 34 and carry respective drive sprockets 58 within the housing enclosure at the outward side of the frame plate 34. An endless drive chain 60 extends about the drive sprockets 56,58 and also about an idler sprocket 62 rotatably mounted to the outward face of the end frame plate 34, as depicted in FIG. 5. If necessary or desirable, the drive motor 52 may be a variable speed motor to enable adjustment of the transport speed of the conveyors 40.

In this manner, the drive motor 52 is effective upon energization to drive the chain 60 and, in turn, drive the link conveyors 40 in opposite directions under which the food transporting run 40' of each conveyor 40 travels downwardly alongside the respective facing side of the platen 14, thereby to transport buns downwardly through each bun transport path P1,P2 from the bun loading opening 28 to the bun discharge opening 29.

The platen 14 is fabricated of a plate-like configuration having substantially flat opposed outward faces 14', preferably formed of a sheet metal or other suitable heat conductive material, with the upwardly projecting edge of the platen 14 being tapered narrowingly at 64 to facilitate loading of buns into each bun transport path P1,P2 through the bun loading opening 28, as more fully described below. The platen 14 houses interiorly one or more electrically operated resistance-type heating elements (not shown) disposed in contact with the opposed outward faces 14' to conduct heat energy thereto. To facilitate sliding movement of sandwich buns along the opposite faces of the platen 14, the outward surfaces 14' have a sufficiently smooth surface finish to resist sticking of the buns. For example, it is preferred that the platen 14 be coated or otherwise covered by a polymeric material having a low coefficient of friction such as polytetrafluoroethylene. Alternatively, the outward faces of the platen 14 could be polished to a sufficiently smooth finish to similarly resist food sticking.

As also shown in FIG. 4, a pair of resistance heating elements 66 are respectively mounted to the end frame plate 36 to extend between the food transporting and return runs 40', 40" of the two conveyors 40 in facing disposition to the opposite respective surfaces 14' of the platen 14. The resistance heating elements 66 may be of any suitable conventional type, such as a plug-type heating element which extends continuously in a sinuous configuration between adjacently disposed connector prongs by which the heating element may be readily mounted and demounted to and from a mating electrical connecting bracket.

In this manner, the platen 14 and the opposed heating elements 66 serve to apply heat energy simultaneously to opposite sides of sandwich buns transported along the bun transport paths P1,P2 by the two conveyor assemblies 16,18 so as to effect toasting of the opposite sides of such buns.

Appropriate electronic control componentry for energizing and adjustably controlling the conveyor drive motor 52, the heating element 66, and the heating elements within the platen 14 are housed within the enclosure outwardly of the end frame plate 36, into which operating electrical current for the toasting apparatus 10 is delivered through a single electrical supply cord 65. Various electrical control arrangements for the conveyor assemblies 16,18 and the heating elements of the toasting apparatus 10 are known and will be apparent to those persons skilled in the art. Such electrical control arrangements do not represent the novel aspects of the present invention and, hence, it is not believed to be necessary to describe the details of the electrical control componentry and circuitry herein. Essentially, the control arrangement provides basic operational control devices mounted to the outward end panel 24 to enable actuation and deactuation of the toasting apparatus 10, such as on-off switches 68,70 for actuating the conveyor drive motor 52 and energization of the platen 14 and the heating elements 66 and a rheostat or similar type of adjusting switch 72 for modulating the driven speed of the conveyors 40. Other control devices not normally to be accessed by unauthorized personnel may be housed within the enclosure of the end frame plate 36, such as a thermostatic adjustment 73 for controlling the heated temperature of the platen 14 and the heating elements 66.

As will be understood by those persons skilled in the art, the effectiveness of the present apparatus 10 in toasting sandwich buns will depend to a significant extent on the maintenance of appropriate contact pressure on the buns by the conveyors 40 so as to reliably transport the buns at a desired speed along the bun paths P1,P2 and to effect proper heat transfer from the opposite sides of the platen 14 to the buns. Hence, the present invention provides a novel arrangement for biasing the food transport run 40' of each conveyor 40 toward the respective facing side of the platen 14 so as to assure that a desirable degree of contact pressure is exerted by each conveyor run 40' on sandwich buns being transported thereby. Such biasing arrangement is best seen in FIG. 6 and is indicated generally therein at 74.

Figure 6:
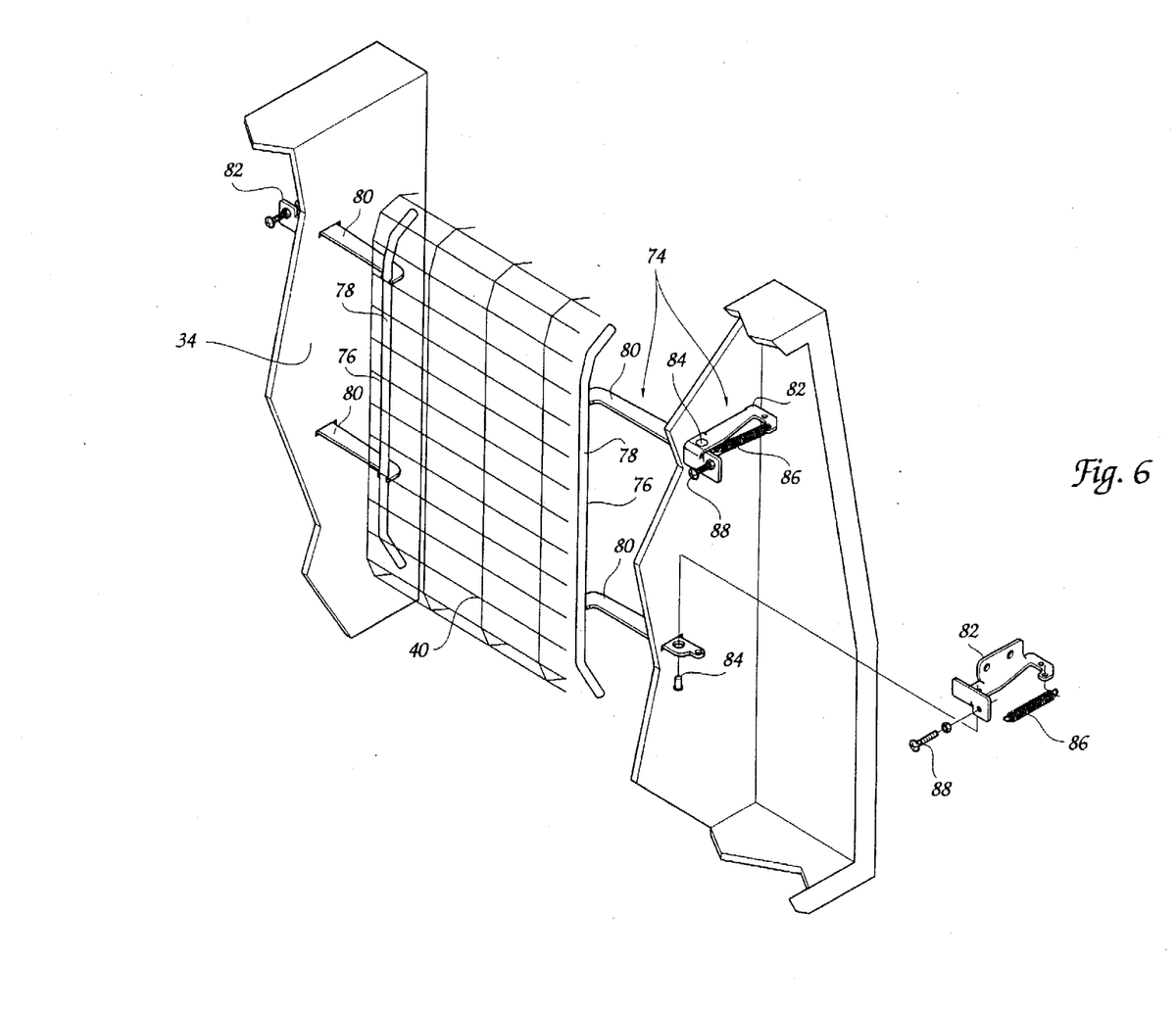
FIG. 6 is a partial perspective view of one conveyor of the toasting apparatus of FIG. 1 with the associated spring biasing arrangement for its food conveying run.

As shown in FIG. 6, the biasing arrangement 74 for each conveyor 40 basically comprises a pair of conveyor engagement arms 76 respectively supported by the opposed end frame plates 34,36 between the opposite runs 40', 40" to extend in spaced parallel relation in the traveling direction of the transporting run 40' for opposed pivoting movement of the arms 76 toward and away from the transporting run 40'. Each arm 76 comprises an elongate conveyor engagement rod 78 substantially linear along its main central portion to extend in generally parallel relation to the platen 14 and slightly angled at its opposite upper and lower ends to extend away from the platen 14 in the direction of the upper and lower conveyor sprockets 42,46. A pair of support legs 80 are rigidly fixed to each rod 78 at spacings along its main linear extent and extend laterally outwardly therefrom through slots correspondingly spaced vertically in the adjacent end frame plate 34 or 36. At the opposite outward side of each frame plate 34,36, a pair of brackets 82 are mounted adjacent the slots and pivotably support the projecting ends of the support legs 80 by rivets 84 for movement about a common vertical pivot axis defined by the rivets 84. A coil spring 86 is attached to the end of each support leg 80 outwardly of the rivet 84 and extends therefrom outwardly to a distal mounting location on the associated bracket 82.

In this manner, the coil springs 86 associated with each engagement rod 78 serve to urge the associated rod 78 to pivot toward the platen into contact with the traveling extent of the transport run 40' of the associated link conveyor 40, while also being yieldable to permit pivoting movement of the arms 76 in the opposite direction away from the associated conveyor 40. Thus, the biasing arrangement 74 serves to urge the conveyors 40 into a predetermined spaced disposition relative to the opposite sides of the platen 14 selected so as to achieve a desirable contact pressure on buns being transported along the paths P1,P2 in substantially continuous sliding contact with the opposite surfaces 14' of the platen 14. As necessary or desirable, a stop bolt 88 may be mounted to each bracket 82 to adjustably establish a positional stop to limit the degree of pivoting movement of the arms 76 outwardly from the platen 14, thereby to additionally ensure continuous maintenance of contact pressure with buns traveling along the transport paths P1,P2.

As previously noted, it will be recognized that sandwich buns of the type commonly used for hamburgers and the like characteristically have a rounded so-called "crown" side and a more flattened so-called "heel" side and such buns typically are sliced intermediately of such crown and heel sides into two bun portions or "halves" which most often are of dissimilar thicknesses, the crown "half" typically being of a greater thickness than the heel "half." Hence, as depicted in FIG. 4, the conveyor assembly 16 is arranged at a slightly greater spacing from the platen 14 than the conveyor assembly 18 at the opposite side of the platen 14, thereby defining the bun transport path P1 to be of a slightly greater thickness dimension appropriate to accommodate the crown portion of sandwich buns while the bun transport path P2 is more narrow so as to accommodate the heel portion of sandwich buns. An appropriate marking appears on one or both of the housing panels 22,26 (see FIG. 2) as a guide to operators to ensure that the crown and heel portions of sandwich buns are properly loaded into the appropriate transport path P1,P2. In each case, the substantially flat sliced inward side of the bun portion is placed to be in facing relation to the platen 14 so as to achieve substantially continuous surface abutment therewith and thereby to obtain substantially uniform toasting of the sliced surface.

Those persons skilled in the art will readily recognize that the toasting apparatus 10 of the present invention achieves a number of distinct advantages over conventional toasting equipment. As with the conveyorized toasting apparatus described in U.S. Pat. No. 4,530,276 discussed above, the toasting apparatus 10 enables the toasting of breads to progress on a automated conveyorized basis as necessary to accommodate high capacity food service in a commercial setting such as fast food restaurant establishments and the like. In contrast to the known conveyorized toaster, however, the toasting apparatus 10 achieves substantially more uniform toasting by providing heated toasting elements at both opposite sides of the bun portions being toasted and, in turn, enables much more rapid and uniform toasting to be achieved. Additionally, by utilizing a variable speed drive motor for the conveyor assemblies 16,18, the present apparatus enables the speed of the conveyors 40 and the toasting results achieved to be selectively adjusted. Whereas the known conveyorized toaster typically requires 60 to 90 seconds to toast a common hamburger bun, the present toasting apparatus 10 can achieve more uniform toasting through the thickness of the bun in about 20 seconds. Advantageously, the novel biasing arm arrangement of the present apparatus 10 effectively maintains bun contact with the platen without excessive pressure and without crushing of the bun portions as occurs with known toasting apparatus.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. Apparatus for conveyorized toasting of breads and food items simultaneously on opposite sides thereof, the apparatus comprising a pair of heated toasting elements arranged in opposed spaced facing relation to one another for simultaneously toasting opposite sides of a food item, conveyor means defining a food transport run extending between the toasting elements for transporting food items between the toasting elements, and means for yieldably biasing the food transport run of the conveyor means to maintain sufficient contact with the food items for transport thereof.

2. Apparatus for conveyorized toasting of breads and food items according to claim 1, wherein the biasing means comprises an arm extending in the food transport direction of the food transport run and supported for pivoting movement toward and away from contact with the food transport run opposite from the food items, and spring means for urging the arm pivotably into contact with the food transport run of the conveyor means.

3. An apparatus according to claim 2, wherein the biasing means comprises a pair of said arms pivoted independently of one another and arranged to contact the food transport run of the conveyor means in generally side-by-side relation.

4. An apparatus according to claim 1, wherein the conveyor means comprises a variable speed drive motor for transporting food items at selectively varying speeds.

5. Apparatus for conveyorized toasting of breads and food items simultaneously on opposite sides thereof, the apparatus comprising a first heated toasting element presenting a generally planar food-contact surface for sliding movement therealong of one side of a food item to be toasted, driven conveyor means arranged to travel along a food transport run extending in spaced facing relation to the planar surface of the toasting element for contacting the opposite side of a food item on the planar surface and transporting the food item slidingly therealong, an auxiliary heated toasting element disposed adjacent the food transport run of the conveyor means opposite from and in facing relation to the first toasting element, the first and second toasting elements being effective for simultaneously toasting food items on the opposite sides thereof, and means for biasing the food transport run of the conveyor means toward the first toasting element for maintaining contact thereof with the opposite sides of food items being transported therebetween.

6. An apparatus according to claim 5, wherein the biasing means comprises an arm extending in the food transport direction of the food transport run and supported for pivoting movement toward and away from contact with the food transport run opposite from the food items and spring means for urging the arm pivotably into contact with the food transport run of the conveyor means.

7. An apparatus according to claim 6, wherein the biasing means comprises a pair of said arms pivoted independently of one another and arranged to contact the food transport run of the conveyor means in generally side-by-side relation.

8. An apparatus according to claim 5, wherein the conveyor means comprises a variable speed drive motor for transporting food items at selectively varying speeds.

9. An apparatus according to claim 6 and further comprising stop means for limiting movement of the arm away from the food transport run of the conveyor means.

10. Apparatus for conveyorized toasting of breads and food items simultaneously on opposite sides thereof, the apparatus comprising:

a housing, a heated platen disposed centrally in the housing and presenting at opposite sides thereof first and second generally planar food-contacting surfaces for sliding movement along each thereof of one side of a respective food item to be toasted, first and second driven conveyor means, the first conveyor means being arranged to travel along a first food transport run extending through the housing in spaced facing relation to the first planar surface of the platen for contacting the opposite side of a first food item on the first planar surface and transporting the first food item slidingly therealong, and the second conveyor means being arranged to travel along a second food transport run extending through the housing in spaced facing relation to the second planar surface of the platen for contacting the opposite side of a second food item on the second planar surface and transporting the second food item slidingly therealong, a first auxiliary heated toasting element disposed within the housing adjacent the first food transport run of the first conveyor means opposite from and in facing relation to the first planar surface of the platen, a second auxiliary heated toasting element disposed within the housing adjacent the second food transport run of the second conveyor means opposite from and in facing relation to the second planar surface of the platen, the first planar surface of the platen and the first auxiliary toasting element being cooperatively effective for simultaneously toasting the first food item on the opposite sides thereof and the second planar surface of the platen and the second auxiliary toasting element being cooperatively effective for simultaneously toasting the second food item on the opposite sides thereof, first means for biasing the first food transport run of the first conveyor means toward the first planar surface of the platen for maintaining contact thereof with the opposite sides of the first food item being transported therebetween, the first biasing means comprising a pair of arms extending in spaced parallel relation to one another in the food transport direction of the first food transport run of the first conveyor means, the arms being supported by the housing for independent pivoting movement toward and away from contact with the first food transport run opposite from the first food item and spring means for urging the arms pivotably into contact with the first food transport run, and second means for biasing the second food transport run of the second conveyor means toward the second planar surface of the platen for maintaining contact thereof with the opposite sides of the second food item being transported therebetween, the second biasing means comprising a pair of arms extending in spaced parallel relation to one another in the food transport direction of the second food transport run of the second conveyor means, the arms being supported by the housing for independent pivoting movement toward and away from contact with the second food transport run opposite from the second food item and spring means for urging the arms pivotably into contact with the second food transport run.

11. An apparatus according to claim 10, wherein each conveyor means comprises a variable speed drive motor for transporting food items at selectively varying speeds.

12. An apparatus according to claim 10, wherein the first biasing means comprises first stop means for limiting movement of the arms away from the first food transport run of the first conveyor means and the second biasing means comprises second stop means for limiting movement of the arms away from the second food transport run of the second conveyor means.

13. An apparatus according to claim 10, wherein the first food item is a crown portion of a sandwich bun and the second food item is a heel portion of the sandwich bun, and the first and second conveyor means are respectively arranged with respect to the platen to dispose the first food transport run at a greater spacing from the first planar surface of the platen than the spacing of the second food transport run from the second planar surface of the platen for transport of the crown portion between the first transport run and the first planar surface and for transport of the heel portion between the second transport run and the second planar surface.

* * * * *